(12) United States Patent
Drouot et al.

(10) Patent No.: US 6,611,295 B1
(45) Date of Patent: Aug. 26, 2003

(54) MPEG BLOCK DETECTOR

(75) Inventors: Antoine Drouot, St Maur (FR); Laurent Rouvellou, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 405 days.

(21) Appl. No.: 09/658,094

(22) Filed: Sep. 8, 2000

(30) Foreign Application Priority Data

Sep. 14, 1999 (EP) .............................. 99402252

(51) Int. Cl.⁷ .................. H04N 5/213; H04N 5/217; H04N 5/21
(52) U.S. Cl. .................. 348/607; 348/606; 348/618; 382/268
(58) Field of Search ................. 348/666, 609, 348/607, 909, 910, 618, 619, 620, 622, 623; 382/268, 199, 205; H04N 5/213, 5/217, 5/21

(56) References Cited

U.S. PATENT DOCUMENTS

| | | | | | |
|---|---|---|---|---|---|
| 5,883,983 A | * | 3/1999 | Lee et al. | .............. | 382/268 |
| 5,920,356 A | * | 7/1999 | Gupta et al. | .............. | 348/606 |
| 6,175,596 B1 | * | 1/2001 | Kobayashi et al. | ......... | 348/606 |
| 6,226,050 B1 | * | 5/2001 | Lee | ..................... | 348/607 |
| 6,285,801 B1 | * | 9/2001 | Mancuso et al. | ........... | 382/268 |

\* cited by examiner

*Primary Examiner*—John Miller
*Assistant Examiner*—Trang U. Tran
(74) *Attorney, Agent, or Firm*—Edward W. Goodman

(57) ABSTRACT

A method of detecting blocking artifacts in digital video pictures, includes a step of filtering (GF) a digital input signal (x) using a gradient filter for providing at least one filtered signal, and a step of calculating (CALC) a block level metric (BM) for processing the filtered signal(s) to identify and count blocking artifacts as a function of their position in a grid. If the block level metric (BM) is lower than a threshold, the picture has either not been encoded using a block-based processing, or has been encoded in a seamless way. In the opposite case, the picture has been encoded using a block-based processing in a non-seamless way and corrective actions, such as a post-processing (PP), can be taken.

12 Claims, 2 Drawing Sheets

| xa$_h$[i,j−1] | xa$_h$[i,j] | xa$_h$[i,j+1] |
| --- | --- | --- |
| xa$_h$[i+1,j−1] | xa$_h$[i+1,j] | xa$_h$[i+1,j+1] |
| xa$_h$[i+2,j−1] | xa$_h$[i+2,j] | xa$_h$[i+2,j+1] |
| xa$_h$[i+3,j−1] | xa$_h$[i+3,j] | xa$_h$[i+3,j+1] |
| xa$_h$[i+4,j−1] | xa$_h$[i+4,j] | xa$_h$[i+4,j+1] |
| xa$_h$[i+5,j−1] | xa$_h$[i+5,j] | xa$_h$[i+5,j+1] |
| xa$_h$[i+6,j−1] | xa$_h$[i+6,j] | xa$_h$[i+6,j+1] |
| xa$_h$[i+7,j−1] | xa$_h$[i+7,j] | xa$_h$[i+7,j+1] |

MPEG BLOCK DETECTOR

BACKGROUND OF THE INVENTION

1. Field of the Invention

The present invention relates to a method and a corresponding device for detecting blocking artifacts in digital video pictures.

The present invention also relates to a method and a corresponding device for processing a sequence of digital video pictures comprising a detection step of blocking artifacts and a post-processing step.

The present invention further relates to a set-top-box and a television set comprising such devices.

2. Description of the Related Art

Video sequences encoded with existing international video encoding standard can sometimes present some degradations, such as blocking artifacts. The commonly encountered degradations can go from very little impairments to heavy degradation depending on the encoding bit rate. Several methods of measuring the blocking artifact level have already been introduced. Based on the human visual sensitivity, said methods require both the original and the reconstructed images and are rather complex to implement. As a consequence, they cannot be used when the original pictures are not available.

To solve this problem, a new method is disclosed in the paper "Quantitative quality metrics for video coding blocking artifacts" by H. R. Wu and M. Yuen in Proceedings of Picture Coding Symposium, vol. 1, pp. 23–28, March 1996. This method uses only the reconstructed video pictures to determine a block level metric. Unfortunately, the block level metric calculation is very complex in terms of number of operations and of memory requirements, making it unrealistic for an implementation in a commercial product. Moreover, this method assumes that the first encoding block starts at the top right pixel of the picture, which is not always true if said picture has been converted to analog before being converted to digital.

SUMMARY OF THE INVENTION

It is an object of the invention to provide a method of detecting blocking artifacts contained in digital video pictures, which processes video pictures without an a prior knowledge of the original pictures or any information related to the encoding process, and which can be easily implemented in a hardware application.

To this end, the method according to the invention is characterized in that the method comprises the steps:

filtering a digital input signal using a gradient filter for providing at least one filtered signal, and calculating a block level metric indicating if the picture has been encoded or not using a block-based processing, for processing the filtered signal(s) to identify and count blocking artifacts as a function of their position in a grid.

Such a method can detect blocking artifacts with an efficient and simple algorithm that only needs the reconstructed pictures. If the computed block level metric is lower than a threshold, the picture has either not been encoded using a block-based processing, or has been encoded in a seamless way. In the opposite case, the picture has been encoded using a block-based processing in a non-seamless way.

The method according to the invention is also characterized in that the calculation step comprises a sub-step of determining a shift of an origin of the grid in the picture in order to compute the block level metric.

Said method does not assume that the first encoding block starts at the top right pixel of the digital video picture. As a consequence, said method can be implemented directly in a television set, without knowing in advance if the incoming picture has been previously converted from digital to analog and then to digital again.

It is another object of the invention to provide a method of processing a sequence of digital video pictures comprising this step of detecting blocking artifacts and a step of post-processing the digital video pictures if the block level metric provided by the detection step is higher than a threshold.

Such a processing method benefits from the block level metric computed in the detection step in order to take the right corrective actions and, consequently, to adapt in a suitable way the post-processing step.

Finally, it is an object of the invention to provide a device implementing such a detection method. Such a device will be advantageously integrated into set-top-boxes or into up-market television sets.

These and other aspects of the invention will be apparent from and elucidated with reference to the embodiments described hereinafter.

BRIEF DESCRIPTION OF THE DRAWINGS

The present invention will now be described, by way of example, with reference to the accompanying drawings, wherein.

DESCRIPTION OF THE PREFERRED EMBODIMENTS

Figures 1, 2:
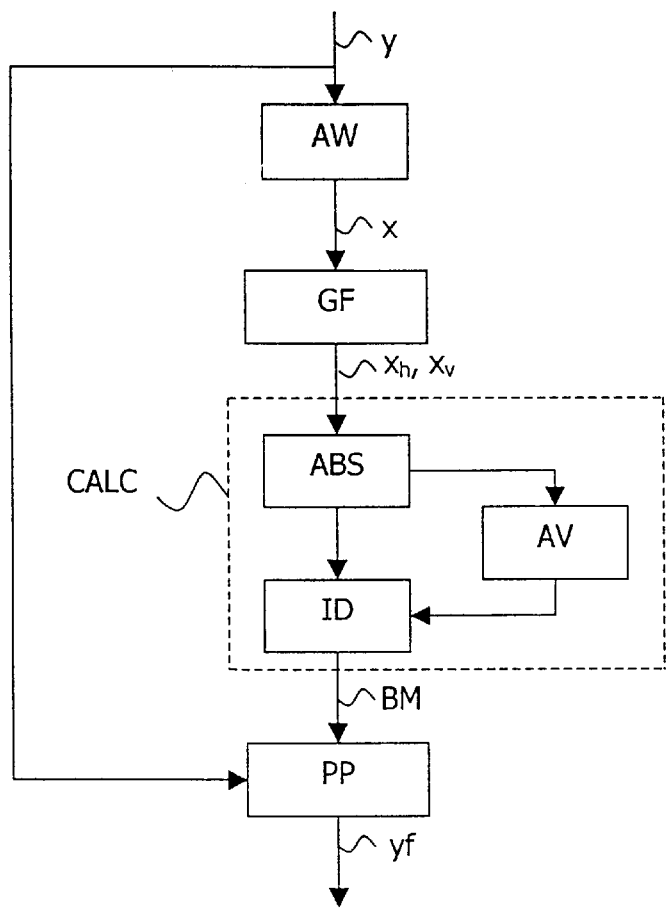
FIG. 1 is a block diagram of an MPEG block detector according to the invention.
FIG. 2 represents the first column of an MPEG block and its two nearest neighbors.

The present invention proposes a new method of detecting blocking artifacts contained in digital video pictures. Such a method comprises two major steps, as illustrated in the block diagram of FIG. 1. The first one is a step of gradient filtering (GF), the second one is a step of calculating a block level metric (CALC).

This method has been developed for MPEG applications, especially for broadcasting applications, but also remains valid for applications using a block-based processing for motion estimation, and a discrete cosine transform (DCT) such as, for example, H.261 or H.263 of the International Telecommunication Union (ITU).

In the preferred embodiment, the detection method uses the luminance component of the video signal, but it is also possible to use the chrominance components of said video signal. This method is successively applied to each field of a picture in the case of an interlaced sequence of pictures, or directly to a frame in the case of a progressive sequence. Moreover, in order to save memory cost, only half a field is scanned in the horizontal direction instead of the whole field. For this purpose, an active window (AW), having a length of 360 pixels and a height of 288 pixels in full-format encoding (i.e., the encoding picture is 720×576 pixels in said format), is positioned in the field in order to select a portion of said field, giving a re-sized video signal (x) from the luminance signal (y) corresponding to the whole field. Anyway, the dimensions of the active window (AW) can be modified depending on the method accuracy or the memory allocation required by the user. The active window (AW) proposed in the invention is a good trade-off between these two parameters, because it divides the memory cost by two without a significant degradation of the results given by the detection method. Said method can also be improved by changing the position of the active window (AW) for each field. In the preferred embodiment, the active window (AW) is put on the left side of the odd field and on the right side of the even field. This implementation is both simple and efficient, but other implementations are possible such as, for example, to take a random active window (AW) for each field.

The re-sized video signal (x) is filtered using the gradient filtering (GF) step. To this end, a high-pass filter $h_1=[-1\ 1]$ is applied in both horizontal and vertical directions, giving, respectively, a horizontal filtered pixel array ($x_h$) and a vertical filtered pixel array ($x_v$). Other gradient filters can be used for this application such as, for example, another one-dimensional filter $h_2=[-1\ 0\ 1]$ or a two-dimensional filter $h_3$, called the Sobel filter, which is defined as follows:

$$h_3 = \begin{bmatrix} -1 & 0 & 1 \\ -2 & 0 & 2 \\ -1 & 0 & 1 \end{bmatrix}.$$

The gradient filter $h_1$ used in the preferred embodiment has been chosen for its high sensitivity and its low complexity.

In another embodiment, the gradient filtering step is performed in only one direction, either the horizontal one or the vertical one, giving, respectively, only a vertical or a horizontal blocking artifact detection, but also leading to a lower efficiency of the detection method.

A calculation step (CALC) is then performed on the two arrays of pixels ($x_h$ and $x_v$), this calculation step comprising three sub-steps.

During the first sub-step (ABS), the arrays of the absolute values of the horizontal and vertical filtered pixels are built.

Then, in the second sub-step (AV), the average of the absolute values obtained in the first sub-step is computed over the field for both horizontal and vertical arrays.

Finally, the third sub-step (ID) consists of the identification of blocking artifacts from the previously computed values of the first and second sub-steps.

The result of the calculation step (CALC) is a blocking artifact level metric (BM) for each field of a sequence of pictures. Depending on the value of said metric (BM), a post-processing step (PP) is either applied or not applied to the incoming video signal (y), giving a filtered signal (yf).

The following notations are used in the present document:

y[i,j] is the luminance array of the incoming field, i being the line index and j being the column index of said field, numbered from 0, x[i,j] is the luminance array corresponding to the re-sized video signal, i and j still being the line index and the column index of the incoming field, $x_h$[i,j] and $x_v$[i,j] are the luminance arrays after the horizontal and vertical gradient filtering step applied to x[i,j], $xa_h$[i,j] and $xa_v$[i,j] are the arrays containing the absolute values of the filtered pixels constituting, respectively, $x_h$[i,j] and $x_v$[i,j], $\overline{xa_h}$ and $\overline{xa_v}$ are the averages of respectively $xa_h$[i,j] and $xa_v$[i,j] over the portion of the field corresponding to the active window (AW).

Blocking artifacts are the result of DCT-block quantization. They occur at the boundary of MPEG blocks. To determine if a blocking artifact is present on a particular block boundary, the characteristics of the filtered arrays $xa_h$[i,j] and $xa_v$[i,j] are investigated. Horizontal blocking artifacts are detected in the vertically filtered array $xa_v$[i,j], whereas vertical blocking artifacts are detected in the horizontally filtered array $xa_h$[i,j]. A blocking artifact is found if the absolute values of the eight filtered pixels $xa_h$[i,j] to $xa_h$[i+7,j] belonging to a block boundary are noticeably greater than their neighbors. FIG. 2 represents the first column of an MPEG block $xa_h$[i,j] to $xa_h$[i+7,j] and its two nearest neighbors. A vertical blocking artifact is detected by the invention if the two following conditions are fulfilled between columns of the horizontally filtered array $xa_h$[i,j]:

$$\begin{cases} xa_h[n,j] > xa_h[n,j-1] + \dfrac{\overline{xa_h}}{2} \\ xa_h[n,j] > xa_h[n,j+1] + \dfrac{\overline{xa_h}}{2} \end{cases} \forall n \in [i, i+7]$$

The same operation is performed between lines of the vertically filtered array $xa_v$[i,j]:

$$\begin{cases} xa_v[i,m] > xa_v[i-1,m] + \dfrac{\overline{xa_v}}{2} \\ xa_v[i,m] > xa_v[i+1,m] + \dfrac{\overline{xa_v}}{2} \end{cases} \forall m \in [j, j+k-1] \text{ with } k = 8, 10 \text{ or } 12$$

The size of the grid 8×k, corresponding to the area of investigation, depends on the MPEG block size and, as a consequence, on the encoding format. Due to the encoding formats mainly used by broadcasters, different grid sizes are possible, such as 8×8, 8×10, 8×12. However, it will be apparent to a person skilled in the art that the invention is not limited to the block of such sizes.

In the preferred embodiment, the horizontal grid size k is determined by computing the distance count_grid between a current blocking artifact and the previous one. If the value of the vertical counter count_V[j−1] is strictly higher than a threshold, which is equal to 3 in this embodiment, and if the distance count_grid is equal to 8, the value of a counter grid_8 is incremented by one; or if the value of the vertical counter count_V[j−1] is strictly higher than the threshold and if the distance count_grid is equal to 10, the value of a counter grid_10 is incremented by one; or if the value of the vertical counter count_V[j−1] is strictly higher than the threshold and if the distance count_grid is equal to 12, the value of a counter grid_12 is incremented by one. Once the field has been processed, the horizontal grid size of 8, 10 or 12 corresponding to the greater counter among grid_8, grid_10 and grid_12 counters is selected. The selection is validated if the same results have been found for the four previous fields. Moreover, the value of the horizontal grid size k must be initialized for the first field, for example to 10.

Figure 3:
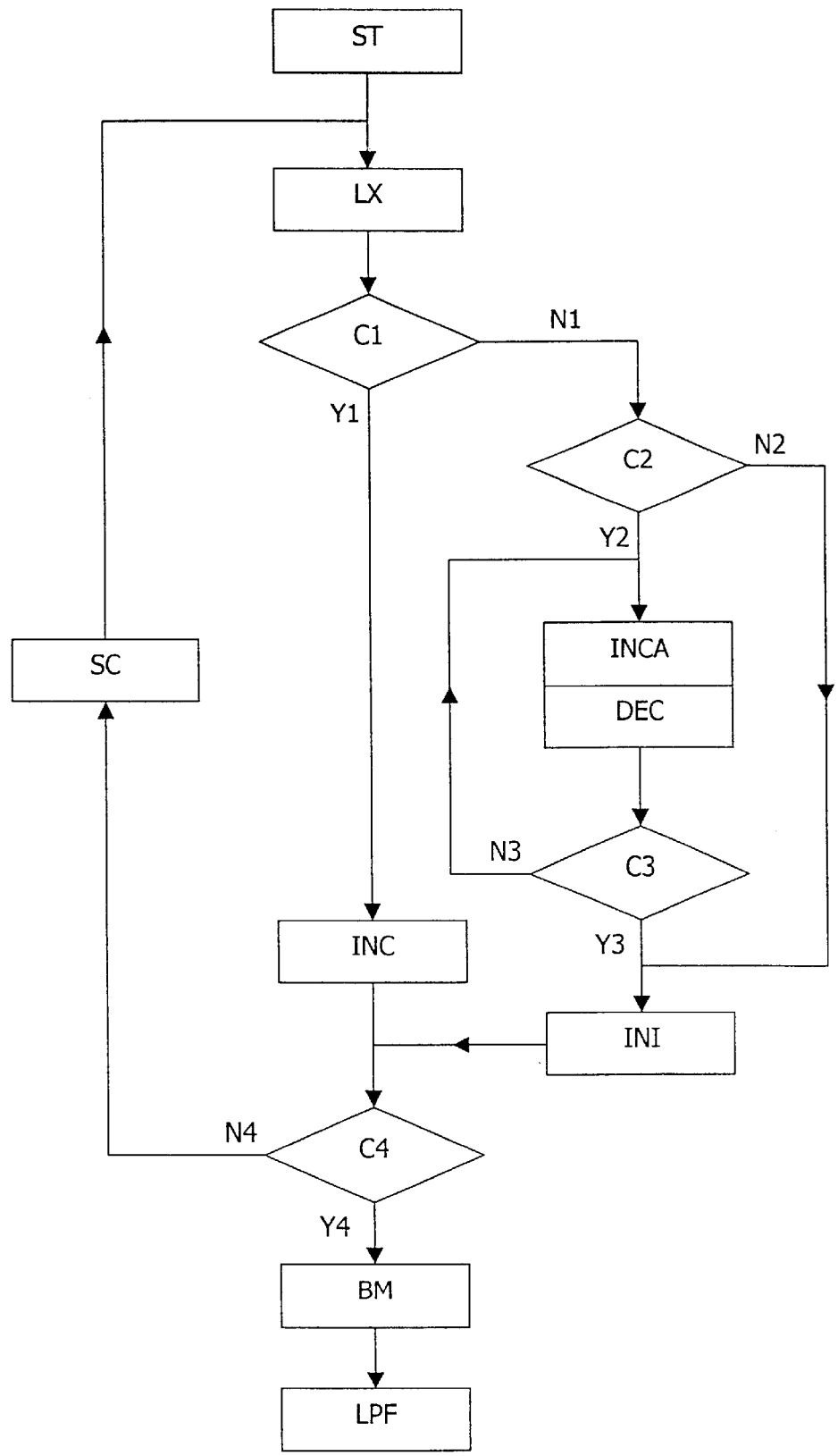
FIG. 3 is a flowchart for the process used to perform the identification of blocking artifacts.

FIG. 3 is a flowchart that describes more precisely the algorithm used to perform the identification of blocking artifacts in a field.

The blocking artifact identification method is described here for the horizontal array giving a vertical artifact characterization. The same algorithm is applied to the vertical array giving a horizontal artifact characterization then.

The scanning process starts at the top-left of the field and with an initialization to zero of the parameters used in the algorithm (ST). Then, the field is scanned line by line down to the bottom-right of the field and, for each pixel of coordinates (i,j) belonging to the re-sized video signal (x), the following tests are performed.

The values of $xa_h[i,j-2]$, $xa_h[i,j-1]$, $xa_h[i,j]$ and $$\overline{xa_h}$$

(respectively, $xa_v[i-2,j]$, $xa_v[i-1,j]$, $xa_v[i,j]$ and $$\overline{xa_v}$$

for the horizontal artifact characterization) are first downloaded (LX). For reasons of implementation, the value of $$\overline{xa_h}$$

is the value computed for the previous field.

A first test (C1) is performed on the downloaded values. The result of the test is true (Y1) if the two following conditions are fulfilled:

$$\begin{cases} xa_h[i, j-1] - xa_h[i, j] > \dfrac{\overline{xa_h}}{2} \\ xa_h[i, j-1] - xa_h[i, j-2] > \dfrac{\overline{xa_h}}{2} \end{cases}$$

In that case (Y1), a vertical counter count_V (respectively, count_H for the horizontal artifact characterization) is incremented by one (INC) for the column j−1 (respectively, for the line i−1); in the opposite case (N1), a second test (C2) is performed on the value of the vertical counter. The result of the second test is true (Y2) if the two following conditions are fulfilled:

$$\begin{cases} \text{count\_V}[j-1] \geq 8 \\ \text{count\_V}[j-1] < \text{contour\_V} \end{cases}$$

where contour_V is the number of vertical consecutive pixels above which the algorithm decides that a vertical contour has been detected. In the preferred embodiment, the value of contour_V is set to 16 pixels, whereas the value of contour_H corresponding to a horizontal contour detection, is set to 3k pixels.

If the second test (C2) is satisfied (Y2), a coefficient artifact_count[p,q] of an array artifact_count corresponding to the grid of investigation whose dimensions are 8×k, is incremented by one (INCA). Then, the vertical counter is decremented by one (DEC). The values of p and q are the following:

$$\begin{cases} p = (i - \text{count\_V}[j-1]) \% 8 \\ q = (j-1) \% k \end{cases}$$

where the result of the operation a%b is the rest of the division of a by b.

The incrementation (INCA) and decrementation (DEC) operations are followed by a third test (C3) and are repeated while the third test is not satisfied (N3), that is while count_V[j−1]≧8.

If the second test (C2) is not satisfied (N2) or if the third test (C3) is satisfied (Y3), the vertical counter count_V[j−1] is set to zero (INI).

After the incrementation step (INC) or the re-initialization step (INI), a fourth and last test (C4) is performed. If the end of the field has not been reached (N4), the scanning process (SC) goes on and the next values of the arrays $xa_h[i,j]$ are downloaded. In the contrary case, the value of a blocking artifact level metric (BM) is computed as follows:

$$BM = \text{artifact\_count}[0, 0] - \frac{1}{8k}\sum_{i=0}^{7}\sum_{j=0}^{k-1} \text{artifact\_count}[i, j].$$

The calculation of the blocking level metric (BM) value has been described assuming that the blocking artifacts detection starts at position (0,0). Such a calculation step can be implemented in a set-top-box just after the decoding process. But to be implemented in a television set, some modifications concerning the blocking level metric calculation have to be done because we have no more hypothesis on the MPEG grid origin in this particular case, as the video has been converted from digital to analog and then to digital again. In this second embodiment, the blocking level metric (BM) is computed as follows:

$$BM = \text{artifact\_count}[\text{shift\_row, shift\_column}] - \frac{1}{8k}\sum_{i=0}^{7}\sum_{j=0}^{k-1}\text{artifact\_count}[i, j] + \frac{IND\left(\text{artifact\_count}[\text{shift\_row, shift\_column}] - \frac{1}{8k}\sum_{i=0}^{7}\sum_{j=0}^{k-1}\text{artifact\_count}[i, j]\right)}{16}$$

where shift_row and shift_column are such that $$\text{artifact\_count}[\text{shift\_row, shift\_column}] = \max_{(i,j)\in([0,7],[0,k-1])}(\text{artifact\_count}[i, j])$$

and where IND is a consistency variable that is incremented by one if two successive fields have the same grid origin and decremented by one in the other case without being negative or higher than 15. However, the grid position must not take into account the vertical grid shift shift_row as described above, which is only valid for a field, but the vertical grid shift shift_row_frame corresponding to a frame. The vertical grid shift of a frame shift_row_frame is computed from the vertical grid shift of a current field shift_row and the one of the previous field last_shift_row as follows:

shift_row_frame=(shift_row+last_shift_row)%8.

The consistency variable (IND) is an indicator of the stability of the grid position accross the successive fields. If this position is stable, that is if the consistency variable (IND) is greater than 5, it means that the sequence is likely to be MPEG encoded.

In addition to the blocking level metric (BM) calculation, the above described method provides the shift of the grid origin, which can be very useful if a block-based post-processing needs to be applied to the incoming video signal.

The value of the blocking artifact level metric (BM) obtained for the two different embodiments is finally low-pass filtered (LPF) over the sequence of pictures in order to achieve a better stability of the method. In the preferred embodiment, a recursive filter is used to perform this operation. This recursive filter allows to obtain the filtered value (BMf) of the block level metric corresponding to a field N and is defined as follows:

$$BMf(N) = BMf(N-1) + \lambda(BM(N) - BMf(N-1))$$

where $\lambda$ is a coefficient ensuring the stability of the process and which is equal to 0,1 in the preferred embodiment.

In another embodiment, the low-pass filtering operation is performed by computing the average of the last processed fields.

The value of the filtered blocking level metric (BMf) is finally compared to a first threshold. This first threshold has been determined by applying the method described here to several sequences of original pictures and by rounding up the highest blocking level metric (BM) reached for a field. If this value is lower than the threshold, the picture is either not MPEG encoded or is MPEG encoded in a seamless way. If this value is higher than the threshold, the picture is MPEG encoded in a non-seamless way. In that second case, corrective actions, such as a post-processing, for example, can be performed in order to remove the artifact. The value of the first threshold depends on the size of the active window (AW) and on the level of degradation which has to be detected.

However, there is a minimum level of degradation that can be detected, this level corresponding to a second threshold. Between the first and the second thresholds, the original sequences cannot be distinguished from slightly degraded sequences, but blocking artifacts that are not visible to the human eye can be strengthened, becoming visible then, by an automatic contrast or sharpness enhancement process. Moreover, the value of the second threshold is such that very few false detections are possible. Thanks to the results given by the above-described detection method, the automatic enhancement algorithms can be switched off or adjusted.

It will be obvious that the verb "comprise" does not exclude the presence of other steps or elements besides those listed in any claim.

What is claimed is:

1. A method of detecting blocking artifacts in digital video pictures comprising pixels, said method comprising the steps:
    filtering a values of the pixels using a gradient filter for providing filtered values;
    determining block artifacts from the filtered values; and
    calculating a block level metric indicating if the picture has been encoded or not using a block-based processing, said calculating step including counting the blocking artifacts in a picture as a function of their position in a grid.

2. The method of detecting blocking artifacts in digital video pictures as claimed in claim 1, characterized in that the calculation step comprises the sub-step:
    determining a shift of an origin of the grid in the picture in order to compute the block level metric.

3. The method of detecting blocking artifacts in digital video pictures as claimed in claim 1, characterized in that said method further comprises the step:
    filtering the value of the block level metric using a low-pass filter.

4. A computer program product for a set-top-box that comprises a set of instructions, which, when loaded into the set-top-box, causes the set-top-box to carry out the method of detecting blocking artifacts as claimed in claim 1.

5. A computer program product for a television set that comprises a set of instructions, which, when loaded into the television set, causes the television set to carry out the method of detecting blocking artifacts as claimed in claim 1.

6. A method of processing a sequence of digital video pictures comprising pixels, said method comprising the steps:
    detecting blocking artifacts in said digital video pictures comprising pixels by:
        filtering a values of the pixels using a gradient filter for providing filtered values;
        determining block artifacts from the filtered values; and
        calculating a block level metric indicating if the picture has been encoded or not using a block-based processing, said calculating step including counting the blocking artifacts in a picture as a function of their position in a grid; and
    post-processing the digital video pictures if the block level metric is higher than a threshold.

7. A device for detecting blocking artifacts in digital video pictures comprising pixels, said device comprising:
    means for filtering values of the pixels using a gradient filter for providing filtered values;
    means for determining block artifacts from the filtered values; and
    means for calculating a block level metric indicating if the picture has been encoded or not using a block-based processing, said calculating means including counting the blocking artifacts as a function of their position in a grid.

8. The device for detecting blocking artifacts in digital video pictures as claimed in claim 7, characterized in that the calculation means comprises means for determining a shift of an origin of the grid in the picture in order to compute the block level metric.

9. The device for detecting blocking artifacts in digital video pictures as claimed in claim 7, characterized in that said device comprises means for filtering the value of the block level metric using a low-pass filter.

10. A set-top-box comprising a device for detecting blocking artifacts as claimed in claim 7.

11. A television set comprising a device for detecting blocking artifacts as claimed in claim 7.

12. A device for processing a sequence of digital video pictures comprising:
    means for detecting blocking artifacts, said detecting means comprising:
        means for filtering values of the pixels using a gradient filter for providing filtered values;
    means for determining block artifacts from the filtered values; and
        means for calculating a block level metric indicating if the picture has been encoded or not using a block-based processing, said calculating means including counting the blocking artifacts as a function of their position in a grid; and
        means for post-processing the digital video pictures if the block level metric is higher than a threshold.

* * * * *